(12) United States Patent
Watine et al.

(10) Patent No.: US 7,655,263 B2
(45) Date of Patent: Feb. 2, 2010

(54) METHOD FOR THE PRODUCTION OF CHEESES WITH SPUN CURD

(75) Inventors: Philippe Watine, Villeneuve d'Ascq (FR); Jean-Claude Bercetche, Ahaxe (FR)

(73) Assignee: Roquette Freres, Lestrem (FR)

( * ) Notice: Subject to any disclaimer, the term of this patent is extended or adjusted under 35 U.S.C. 154(b) by 452 days.

(21) Appl. No.: 10/555,315

(22) PCT Filed: Apr. 29, 2004

(86) PCT No.: PCT/FR2004/001039

§ 371 (c)(1), (2), (4) Date: Sep. 5, 2006

(87) PCT Pub. No.: WO2004/098302

PCT Pub. Date: Nov. 18, 2004

(65) Prior Publication Data

US 2007/0042081 A1 Feb. 22, 2007

(30) Foreign Application Priority Data

May 5, 2003 (FR) .................................. 03 05442

(51) Int. Cl.
*A23C 9/12* (2006.01)

(52) U.S. Cl. .............................. 426/36; 426/34; 426/39; 426/582

(58) Field of Classification Search .................... 426/34, 426/36, 38, 39, 42, 518, 520, 580, 582
See application file for complete search history.

(56) References Cited

U.S. PATENT DOCUMENTS

| 4,919,944 | A | 4/1990 | Bussiere et al. |
| 5,009,914 | A | 4/1991 | Serpelloni |
| 5,902,625 | A | 5/1999 | Barz et al. |
| 6,113,953 | A | 9/2000 | McMahon et al. |

FOREIGN PATENT DOCUMENTS

| EP | 0 312 359 | 4/1989 |
| EP | 0 347 308 | 12/1989 |
| EP | 1 055 373 | 11/2000 |
| FR | 2 591 433 | 6/1987 |

OTHER PUBLICATIONS

Jana A H et al: "Process Standardization for Manufacture of Mozzarella Cheese From Homogenized Buffalo Milk" Indian Journal of Dairy Science, XX, XX, vol. 45, May 1, 1992, (1192-05-01), pp. 256-260, XP00522468 the whole document.

*Primary Examiner*—Leslie Wong
(74) *Attorney, Agent, or Firm*—Young & Thompson

(57) ABSTRACT

A method for production of cheeses with spun curd from pasteurized milk, includes the successive steps of preparation of the milk, renneting, coagulation, curd-cutting, drainage and spinning, characterized in that during the phase of preparation of the milk which has a low content of exogenous calcium salts, the milk is thermally treated at a temperature between 80 and 85° C. and an effective amount of an acidifying agent is added before or after the thermal treatment.

5 Claims, No Drawings

METHOD FOR THE PRODUCTION OF CHEESES WITH SPUN CURD

This application is a 371 of PCT/FR04/01039, filed Apr. 29, 2004.

The present invention relates to a novel method for the production of spun-curd cheeses.

More specifically, the invention relates to a novel method for the production of spun-curd cheeses, according to which a pasteurized milk is used, which is acidified before or after pasteurization in a controlled manner by means of an acidogenic agent.

In the context of the present invention, the term "spun-curd cheeses" is intended to mean, in accordance with the classification given in the work "Le Fromage" ["Cheese"], by André E C K, Technique et Documentation (Lavoisier, Paris, 1984), page 245, plastic-curd cheeses in which said curd, once the serum has been drained, is immersed either in hot water or in hot serum, and worked, pulled, before being molded when it is in the plastic state. The main cheeses that fall within this category are in particular cheeses of the type: Mozzarella, Provolone, Sarde, Metton, and pizza cheeses.

Conventionally, spun-curd cheeses are produced from whole or partially skimmed milk, which is renneted and acidified. The renneting consists in adding coagulating enzymes to the matured milk.

The curd formed is cut into slices (curd-cutting) until grains having a desired size are obtained, and drained, then heated, so as to accentuate, inter alia, the departure of the serum from the curd grains. When the desired acidification is obtained, the curd is vigorously mixed, pulled, modeled and smoothed, either manually, or with a machine, in water or warm serum, and then rapidly cooled, dried and salted.

The starting raw milk can be subjected to operations consisting of thermal treatment and of maturation, by means of the addition of lactic ferments which result in acidification of the milk to a pH value corresponding to the demands required for the subsequent renneting step, generally between approximately 6.5 and 6.

It is known that increasing the pasteurization temperature of cheese-making milks can make it possible to increase the cheese yield, and that it is advantageous for hygiene reasons to be able to treat milks at temperatures above 72° C. It is also known that such thermal treatments reduce the ability of the milk to convert to cheese. The applicant has therefore provided, in its patent EP 347.308 B1, a solution for overcoming all the difficulties inherent in the use of milks treated at high temperatures. This solution consists of the addition to the these milks of an acidogenic agent chosen from gluconolactones or glucoheptonolactones, making it possible to restore the cheese-producing capacities without resorting to novel technologies. Thus, it has become possible to produce renneted cheeses, such as in particular soft cheeses, from milks heated to more than 78° C.

However, the applicant has noted that this overheating method does not make it possible to produce spun-curd cheeses according to conventional technology. This is because, and as will be demonstrated later, the treatment of milks at certain temperatures is incompatible with satisfactory curd-spinning properties. The spinning ability is the determining criterion of this type of cheese. The spinning is a type of fibration by pulling, and it is important to promote sliding of the fibers over themselves in order to obtain maximum spinning. Now, spinning is not possible, or else is mediocre, when a milk pasteurized at high temperature and acidified with glucono-delta-lactone (hereinafter defined by the abbreviation "GDL") is used.

There was therefore an unsatisfied need for a method for the production of spun curds from milks pasteurized at high temperature and acidified with an acidogenic agent.

Seeking to find a solution to this problem, the applicant noted that a gradual increase in the milk treatment time/temperature couple sizably decreased the spinning ability. The curds obtained became increasingly less cohesive, dispersing at the highest temperatures, and giving an increasingly shorter curd texture. The milk pasteurization temperature and time are therefore critical parameters in the production of spun curds.

Moreover, the spinning ability of curds derived from heated milks is improved by increasing amounts of acidogenic agent. However, the spun curds obtained still exhibit mediocre technological abilities.

Furthermore, it has always been necessary to correct thermally treated milks by adding calcium salts, and in particular calcium chloride, after treatment, so as to decrease the solidifying time and to increase the rate of firming of the coagulum, and also to improve the rheological properties of the curd. It may in fact be noted that all the cheeses described in the abovementioned patent EP 347.308 B1 are produced using a milk treated at a high temperature, to which calcium chloride is then added so as to correct the technological abilities of the curd and to obtain the same solidifying time as with raw milk. Now, in the case of spun curds prepared from milk treated at high temperature, the applicant has noted, in the course of many trials, that the addition of calcium chloride to the milk runs counter to the spinning abilities.

To the applicant's credit, it has noted that, surprisingly, by combining the effect of a selected pasteurization time/temperature couple, an optimized dose of acidogenic agent, and a depletion of the milk in terms of exogenous calcium salts, it is possible to aspire to the production of spun curds of quality comparable, and even superior, to spun curds obtained according to conventional techniques.

Without wishing to be bound to any theory, it appears that the acidogenic agent plays a predominant role in terms of calcium balances during the coagulation of the milk. Thus, the presence of a certain dose of acidogenic agent would act as a calcium store, thus regulating the mineralization of the curd and allowing suitable, or even improved, spinning when the cheese-forming conditions or the conditions of thermal treatment of the milk are unfavorable. Calcium chloride cannot in itself constitute a store since adding it alone immediately increases the portion of ionized calcium and abruptly modifies the micellar equilibrium.

A subject of the invention is therefore a method for the production of spun-curd cheeses from pasteurized milk, comprising the successive steps of preparation of the milk, renneting, coagulation, curd-cutting, draining and spinning, characterized in that, during the phase consisting of preparation of the milk, which has a low exogenous calcium salt content, said milk is thermally treated at a temperature of between 80 and 85° C., and an effective amount of acidogenic agent is added before or after said thermal treatment.

For the purpose of the present invention, the term "exogenous calcium salts" is intended to mean the non-micellar calcium salts intentionally introduced into the milk in order to correct its technological abilities, and in particular calcium chloride. The term "low content" is intended to mean the fact that the milk used in the method according to the invention contains little or no added calcium salts. Since the composition of milks is very variable according to their origin, a low exogenous calcium salt content allowing the implementation of the present invention is reflected by a milk preferably comprising less than 0.4 g of calcium salts per liter of milk, more preferably less than 0.2 g/l, and even better still less than 0.1 g/l. According to a preferred variant of the method according to the invention, the milk is free of exogenous calcium salts.

The milk used according to the invention is a non-reconstituted milk of any origin, that is raw or has undergone prior thermal treatment at a temperature of less than 78° C., that has optionally undergone standardization in terms of fatty content, and/or that has undergone adjustment in terms of protein content by ultrafiltration. It is also possible to use a reconstituted milk (mixture of powdered milk and water) or a recombined milk (mixture of powdered milk, water and milk fat).

The term "acidogenic agent" is understood to mean any substance capable of gradually generating an acid in milk, either by solubilization or by release. Among the substances capable of gradually generating an acid in milk by solubilization are in particular lactones such as glucono-delta-lactones and glucoheptonolactones, and the like, and/or mixtures thereof, which, in an aqueous medium, gradually hydrolyze to the corresponding acid. Among the substances capable of gradually generating an acid in milk by release, are, for example, acids attached to a delayed-solubilization or delayed-disintegration support.

The introduction of acidogenic agent can be carried out, without implied distinction, in the form of a powder or in the form of a solution.

When the preference is to provide this acidogenic agent in the form of a solution, i.e. a solution in water or milk, said solution is advantageously prepared at the time of use in order to preserve the acidogenic nature of the agent as defined above.

By way of indication, the acidogenic agent may be introduced into raw milk, before or after a first optional pasteurization treatment, before or after the thermal treatment for the purpose of the invention, i.e. at between 80 and 85° C.

It appears, however, that it is preferable to introduce the acidogenic agent into the milk after the thermal treatment according to the invention.

Preferably, the thermal treatment of the milk is carried out at a temperature of between 80 and 82° C. Very good results have been obtained when the treatment is carried out at 80° for 20 to 60 seconds, and preferably for 20 seconds. The spinning is also very good after treatment at 82° C.; however, a few grains of serum proteins appear in the curd. Beyond 82° C., spinning is no longer possible.

As regards the acidogenic agent, glucono-delta-lactone (GDL) is preferably used. Advantageously, the latter is added at a rate of 0.5 to 1.5 g/l, preferably of 0.7 to 1 g/l of milk, and even more preferably at a rate of 1 g/liter of milk. Such a dose of GDL makes it possible to obtain a pH at spinning of a minimum of 5.4, and preferably 5.1, based on which pH the applicant has demonstrated the best chances of spinning.

All the steps subsequent to the milk preparation phase are characteristic of spun-curd technology and will be chosen according to the general knowledge of those skilled in the art.

The method in accordance with the invention has many advantages compared with the prior art, besides that of allowing the spinning of curds obtained by acidification of a pasteurized milk with GDL. It sizably increases production yields by allowing a gain in recovered nitrogenous substances that is greater than that of the conventional methods, which is an obvious economical advantage, and it makes it possible, through reducing the ionized calcium contents, to combat the proliferation of bacteriophages that are responsible for the attack and lysis of lactic ferments and that disturb the acidification of the milk, the formation of the curd and its organoleptic quality.

In addition, it is highly possible that the doses of ferments and of coagulants to be added may be decreased, which is another economical advantage.

The invention will be understood more clearly on reading the examples which follow and which contain the description of advantageous embodiments. All these examples were carried out by the Ecole Nationale d'Industrie Laitière [National Dairy Industry School] in MAMIROLLE-BESANCON (France) in connection with the company Chr. HANSEN France (ARPAJON-France).

EXAMPLE 1

A raw milk 12/24 h old when collected, stored raw at 4° C. for 24 h, with a standardized fat content of 36 g/l, is prepared according to the following characteristics:

Pasteurization: 75° C./30 s and 60 s, 80° C./60 s, 85° C./60 s and 90° C./60 s;

$CaCl_2$ supplement: 90 ml/hl of a solution containing 470 g/l of $CaCl_2$, i.e. a content of 0.42 g/l of milk;

Addition of GLD: 0 for the control, 0.7 g/l for the trials.

This milk is heated to 38° C. (maturation temperature), ferments are added (STM5-2%) and subjected to a maturation time of 30 minutes. The renneting pH is 6.35. The renneting is then carried out, at 38° C., using CHYMAX PLUS at a dose of 16.3 ml/hl. The ferments and the coagulant, and also the glucono-delta-lactone, were provided by the company Chr. HANSEN France (ARPAJON-France).

The solidification time is 10 minutes, the hardening time is 30 minutes. The gel obtained is cut up, stirred and acidified under serum in a closed tank for 2 h to 2 h 30 min until a minimum spinning pH of 5.4 is obtained. The spinning is carried out by hand, in water at 85° C.

The results obtained are given in the table below:

| | Control 1 | Control 2 | Trial 1 | Trial 3 | Trial 4 |
|---|---|---|---|---|---|
| Thermal treatment | 73° C. 30 sec | 73° C. 60 sec | 80° C. 60 sec | 85° C. 60 sec | 90° C. 60 sec |
| $CaCl_2$ dose (ml/hl) | 20 | 90 | 90 | 90 | 90 |
| GDL dose (g/l) | 0 | 0.7 | 0.7 | 0.7 | 0.7 |
| SPINNING (marked from 1 to 10) | 10 | 8 | 6 | 1 | 0 |
| SPINNING (length of strand in cm) | >100 | >100 | 30 | 0 | 0 |

Conclusions of the Trials and Observations:

The gradual increase in the thermal treatment temperature/time couples of the milk brings about a different behavior in terms of the milk coagulation and draining, but which is recovered by means of the $CaCl_2$ and GDL corrections. However, despite the corrections introduced, any treatment greater than 80° C./60 s makes manual spinning very difficult. The curd is not cohesive, or even disperses at the highest temperatures, it dries, and the strand is shorter as the couple increases. The limiting couple is that at 80° C./60 s, where spinning was nevertheless possible, although relatively weak. The choice of an appropriate pasteurization temperature is not sufficient on its own to confer satisfactory spinning abilities.

EXAMPLE 2

The same milk as in example 1 is prepared according to the following characteristics.

Pasteurization: 72° C./20 sec for the control, and 80° C./20 sec, 82° C./20 sec;
CaCl$_2$ supplement: 20 ml/hl or 90 ml/hl of a solution containing 470 g/l of CaCl$_2$, i.e. a content of 0.09 g/l or of 0.42 g/l of milk.
GLD supplement: none or 0.3 to 1 g/l.

This milk is heated to 36° C. (maturation temperature), ferments are added (STM5-8 g/hl), and a maturation time of 60 minutes is observed. The renneting pH is 6.55-6.6 for the control and 6.45-6.50 for the trials. The renneting is then carried out, at 36° C., using CHYMAX PLUS at a dose of 17 ml/hl for the control and 13 ml/hl for the trials.

The solidifying time is 20 minutes, the hardening time is 50 minutes. The gel obtained is cut up, heated at 40° C. for 4 minutes, stirred, and acidified under serum in a closed tank for 2 h to 2 h 30 min until a minimum spinning pH of 5.4 is obtained. The spinning is carried out by hand, in water at 85° C., or with a machine when this is possible.

The results are given in the table below:

This milk is heated to 41° C. (maturation temperature), ferments are added (STM5-8 g/hl) and a maturation time of 60 minutes is observed. The renneting pH is 6.55-6.6 for the control and 6.45-6.50 for the trials. The renneting is then carried out, at 36° C., with CHYMAX PLUS at a dose of 25 ml/hl.

The solidifying time is 8-10 minutes, the hardening time is 24-30 minutes. The gel obtained is cut up, heated at 40° C. for 4 minutes, stirred, and acidified under serum in a closed tank for 2 h to 2 h 30 min until a minimum spinning pH of 5.4 is obtained. The spinning is carried out by hand, in water at 85° C.

The results are given in the table below:

|  | Control 1 | Trial 5 | Trial 6 | Trial 7 | Trial 8 | Trial 9 | Trial 10 |
| --- | --- | --- | --- | --- | --- | --- | --- |
| THERMAL TREATMENT | 72° C. 20 sec | 80° C. 20 sec | 80° C. 20 sec | 80° C. 20 sec | 82° C. 20 sec | 82° C. 20 sec | 82° C. 20 sec |
| CaCl$_2$ dose (ml/hl) | 20 | 90 | 90 | 90 | 90 | 90 | 90 |
| GDL dose (g/l) | 0 | 0.3 | 0.5 | 0.7 | 0.5 | 0.7 | 1 |
| SPINNING (marked from 1 to 10) | 10 machine | 2 manual | 2 manual | 8 machine | 2 manual | 5 machine | 7 machine |
| SPINNING (length of strand in cm) | >100 | 8 | 52 | 57 | 62.5 | 31.3 | 50 |

Conclusions and Observations of the Trials:

Trials 5 and 6: a strand difficult to obtain is observed, it is not possible to use it in a machine;

Trial 7: the spinning is inferior to the control and the curd obtained is too firm.

The thermal treatment temperatures are correct, but the GDL corrections of less than 0.7 g/l do not allow satisfactory spinning.

Trial 8: only manual spinning is possible, but the curd remains very hard.

Trial 9: a medium spinning ability is observed, which allows machine spinning, but the curd remains hard, brittle, and not smooth enough.

Trial 10: this trial is the best of the series; the texturing can be done by machine, but the curd is still harder than the control, and exhibits medium smoothing, with the presence of grains in the fibers produced.

The choice of appropriate dose of GDL is not sufficient on its own, or combined with a selected pasteurization, to improve the spinning properties of the curd.

EXAMPLE 3

The same milk as in example 1 is prepared according to the following characteristics:
Pasteurization: 72° C./20 sec for the control, and 80° C./20 sec, 82° C./20 sec, 85° C./20 sec;
CaCl$_2$ supplement: 20 ml/hl or 90 ml/hl or nothing;
GDL supplement: none or 1 g/l.

|  | Control 1 | Trial 11 | Trial 12 | Trial 13 | Trial 14 |
| --- | --- | --- | --- | --- | --- |
| Thermal treatment | 72° C. 20 sec | 85° C. 20 sec | 85° C. 20 sec | 82° C. 20 sec | 80° C. 20 sec |
| CaCl$_2$ dose (ml/hl) | 20 | 90 | 0 | 0 | 0 |
| GDL dose (g/l) | 0 | 0 | 1 | 1 | 1 |
| SPINNING (marked from 1 to 10) | 9 | 3 | 2 | 9 | 10 |

The spinning ability limit lies at a thermal treatment of 82° C./20 sec and 1 g/l of GDL.

With this scheme, the spinning is good but the curd exhibits a few grains.

Trials 11 and 12 give a curd that it would not be possible to use in a machine.

The best results are obtained for trial 14, without calcium chloride, with a treatment at 80° C./20 sec and 1 g/l of GDL. This trial gives better results than the control. The choice of a specific thermal treatment, combined with an optimal dose of GDL and an absence of calcium correction, makes it possible not only to improve the spinning properties of the curd, but also to confer on it a superiority compared to the control which corresponds to the conventional technology of the prior art.

The invention claimed is:

1. A method for the production of spun-curd cheeses from pasteurized milk, comprising the successive steps of:
   preparing the milk;

renneting;
coagulating;
curd-cutting;
draining; and
spinning, wherein,
the step of preparing the milk, which has a low exogenous content, comprises (i) a thermal treatment of the milk at a temperature between 80 and 82° C. for a time period between 20 and 60 seconds and (ii) an addition of an acidogenic agent to the milk in an amount of 0.7 to 1.5 g/l of milk before or after said thermal treatment, and
the temperature of the thermal treatment, the time period for the thermal treatment, and the amount of acidogenic agent added, in combination, provide a cheese curd that is satisfactory for the spinning step.

2. The method as claimed in claim 1, wherein the acidogenic agent is chosen from gluconodeltalactones and glucoheptonolactones.

3. The method as claimed in claim 1, wherein the acidogenic acid is glucono-delta-lactone.

4. The method as claimed in claim 1, wherein the milk has an exogenous calcium salt content of less than 0.4 g/l.

5. The method as claimed in claim 1, wherein the milk has an exogenous calcium salt content of less than 0.2 g/l.

* * * * *

UNITED STATES PATENT AND TRADEMARK OFFICE
CERTIFICATE OF CORRECTION

PATENT NO. : 7,655,263 B2
APPLICATION NO. : 10/555315
DATED : February 2, 2010
INVENTOR(S) : Watine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 820 days.

Signed and Sealed this

Twenty-eighth Day of December, 2010

David J. Kappos
*Director of the United States Patent and Trademark Office*